US007616375B2

(12) United States Patent
Hirai et al.

(10) Patent No.: US 7,616,375 B2
(45) Date of Patent: Nov. 10, 2009

(54) DISPLAY DEVICE, METHOD FOR MANUFACTURING DISPLAY DEVICE, AND ELECTRONIC PAPER

(75) Inventors: Eiju Hirai, Fujimi (JP); Masayoshi Todorokihara, Fujimi (JP); Yuko Komatsu, Suwa (JP)

(73) Assignee: Seiko Epson Corporation (JP)

( * ) Notice: Subject to any disclaimer, the term of this patent is extended or adjusted under 35 U.S.C. 154(b) by 107 days.

(21) Appl. No.: 12/017,174

(22) Filed: Jan. 21, 2008

(65) Prior Publication Data

US 2008/0174852 A1  Jul. 24, 2008

(30) Foreign Application Priority Data

Jan. 22, 2007 (JP) ............................. 2007-011379

(51) Int. Cl.
G02B 26/00 (2006.01)
G09G 3/34 (2006.01)
(52) U.S. Cl. ...................................... 359/296; 345/107
(58) Field of Classification Search ................. 359/296; 345/107; 430/32; 204/600; 349/41, 49
See application file for complete search history.

(56) References Cited

U.S. PATENT DOCUMENTS 6,987,503 B2  1/2006  Inoue

2006/0250534 A1*  11/2006  Kutscher et al. .............. 349/41

FOREIGN PATENT DOCUMENTS

| JP | 07-325319 | 12/1995 |
| JP | 09-138428 | 5/1997 |
| JP | 11-271712 | 10/1999 |
| JP | 2002-169181 | 6/2002 |
| JP | 2003-223272 | 8/2003 |
| JP | 2006-064731 | 3/2006 |

\* cited by examiner

*Primary Examiner*—William C Choi
(74) *Attorney, Agent, or Firm*—Harness, Dickey & Pierce, P.L.C.

(57) ABSTRACT

A display device of active matrix driving type has a plurality of pixel regions arranged in a plane, each of the pixel regions including a selection switching element that controllably switches a supply of a signal to the each of the pixel regions, a pressure sensitive switching element that controllably switches a supply of a signal to the each of the pixel regions in response to an input of an external pressure, and a retention capacitance that retains a signal supplied to the each of the pixel regions, wherein the pressure sensitive switching element includes a semiconductor layer having a channel region, and a piezoelectric film laminated on the channel region, and the retention capacitance includes a pair of capacitance electrodes and a ferroelectric film sandwiched between the pair of capacitance electrodes.

11 Claims, 6 Drawing Sheets

DISPLAY DEVICE, METHOD FOR MANUFACTURING DISPLAY DEVICE, AND ELECTRONIC PAPER

The entire disclosure of Japanese Patent Application No.2007-011379, filed Jan. 22, 2007 is expressly incorporated by reference herein.

BACKGROUND

1. Technical Field

The present invention relates to display devices, such as, for example, electrophoretic display devices, methods for manufacturing display devices, and electronic paper.

2. Related Art

Display devices using a variety of electrooptic materials have been provided in the fields of electrophoretic materials and liquid crystal materials in recent years. Also, digitizing tablets (digitizing devices) have been proposed, competing with, for example, display panels (display devices) using light emitting diodes (see, for example, Japanese Laid-open Patent Application JP-A-2003-223272). Various types of digitizing devices are known, as described in the prior art section of Japanese Laid-open Patent Application JP-A-2003-223272.

A digitizer device is composed such that data can be directly inputted through writing letters and drawing figures by the user, and indicating the position of a stylus with respect to a digitizer array. Concretely, the following types are known.

(1) A type in which a tip section of a stylus is directly contacted with a capacitive-resistive array.

(2) A type in which an electromagnetic digitizer that interacts with a stylus with a magnetic tip structure or an electromagnetic field generation type stylus is used when the user inputs data for executing a desired operation.

(3) A type equipped with a stylus that is provided with a RF transmitter for transmitting signals to a digitizing array.

(4) A type that uses a stylus having a light source assembled at its tip section, such as, a visible light source or an infrared light source that reflects at a pad.

In general, a digitizer device may be provided independently of a display device when a relatively large work area is required compared to the size of a monitor that serves as the display device, and assembled in one piece with a display device when its portability is necessary.

However, the above-described digitizer devices of prior art entail the following problems. It is difficult for the digitizer device to accommodate the trend towards larger screens because its processing speed is proportional to the performance of the processor. Also, the digitizer device requires electrical power even in its standby period when direct input is not conducted, such that it is difficult to achieve lower power consumption. Furthermore, there are demands to output images displayed on the display device externally as data.

SUMMARY

In accordance with an advantage of some aspects of the invention, it is possible to provide a display device that is capable of maintaining the trend towards lower power consumption and accommodating the trend towards larger screen size, capable of inputting underlines, memos and the like directly into a display screen and displaying the same on the display screen, and capable of reading out the displayed image from outside, a method for manufacturing such a display device, and electronic paper.

A display device in accordance with an embodiment of the invention pertains to a display device of active matrix driving type having a plurality of pixel regions arranged in a plane, wherein each of the pixel regions includes a selection switching element that controllably switches a supply of a signal to the pixel region, a pressure sensitive switching element that controllably switches a supply of a signal to the pixel region in response to an input of an external pressure, and a retention capacitance that retains a signal supplied to the pixel region, wherein the pressure sensitive switching element includes a semiconductor layer having a channel region, and a piezoelectric film laminated on the channel region, and the retention capacitance includes a pair of capacitance electrodes and a ferroelectric film placed between the pair of capacitance electrodes.

According to the embodiment of the invention described above, the pressure sensitive switching element is provided, whereby, in addition to a normal display obtained through the selection switching element, another independent display can be performed through direct input using a pen or the like. Also, the pixel region has a retention property to retain a displayed image, lower power consumption and larger sized screen can be achieved. Furthermore, an electrical signal may be supplied to the pixel region to accumulate an electrical charge in the retention capacitance, such that the display state in the pixel region can be read from outside.

More specifically, upon application of a pressure to the pressure sensitive switching element, an electrical charge is generated by piezoelectric conversion at the channel region of the semiconductor layer and the laminated piezoelectric film. Then, by the generated electrical charge, the pressure sensitive switching element is turned to an ON state. By this, an electrical signal is supplied to the pixel region. In this manner, in addition to a normal display obtained by supplying a signal through the selection switching element, another display of, for example, underlines, memos and the like by direct input through the pressure sensitive switching element can be obtained. It is noted that, because the pressure sensitive switching element is a pressure sensor, an ordinary pen or the like that can apply a pressure can be used for direct input, instead of a special-purpose pen having a power supply and special functions.

In this instance, because the pixel region itself has the retention property to retain a displayed image, coordinate positions of each of the pixel regions do not need to be always detected. For this reason, a processor for detecting coordinate positions does not need to be provided independently. Therefore, electrical power for retaining the display state is not required in the standby period, such that lower power consumption can be achieved. Moreover, the pressure sensitive switching elements are provided for the individual pixel regions, respectively, and function independently from one another, and the pixel region has the retention property to retain a displayed image, whereby the display screen can be readily made into a larger screen.

Also, the retention capacitance and the selection switching element form a 1T1C type ferroelectric nonvolatile memory. For this reason, by detecting the amount of electric charge accumulated (the orientation of polarization) in the retention capacitance through the pressure sensitive switching element or the selection switching element, the display state in the pixel region can be read out as data.

Further, as the pressure sensitive switching element has a layered structure and does not have a section that is movable upon application of an external pressure, it has high reliability as a switching element and can have a longer service life, compared to, for example, a mechanical switching element having a pair of electrodes disposed opposite to each other with a gap provided between them in which the electrodes are brought in contact with each other upon applying a pressure thereto. In other words, in the case of the mechanical switching element having the structure described above, repetitive use thereof may cause deformation in the electrodes whereby the electrodes may remain contacting each other without being able to separate from each other in a short-circuited state, or may remain in an open state in which the electrodes cannot be brought in contact with each other. By using the piezoelectric conversion, occurrence of such a short circuit state and an open state can be suppressed. Also, as having the laminated structure, the pressure sensitive switching element can be readily manufactured.

Also, in the display device in accordance with an aspect of the embodiment of the invention, the semiconductor layer may have a source region conductively connected to a signal line. In this embodiment, when the pressure sensitive switching element becomes an ON state, a signal may be supplied to the pixel region from the signal line through the source region.

Also, in the display device in accordance with an aspect of the embodiment of the invention, the selection switching element may preferably be connected to the signal line. In this embodiment, a signal supplied to the pixel region through the selection switching element and a signal supplied to the pixel region through the pressure sensitive switching element can be supplied through the common signal line, whereby the number of signal lines can be reduced, and the structure can be simplified.

Also, in the display device in accordance with an aspect of the embodiment of the invention, the selection switching element may preferably be connected to another signal line. In this embodiment, driving for a normal display and driving by direct input can be adjusted to have different display characteristics, respectively. Also, when performing direct input, an application of voltage to the other signal line that is connected to the selection switching element may be avoided, whereby generation of a leakage current that may be caused by the selection switching element can be suppressed. Similarly, when performing a normal display, an application of voltage to the signal line that is connected to the pressure sensitive switching element may be avoided, whereby generation of a leakage current that may be caused by the pressure sensitive switching element can be suppressed.

Also, in the display device in accordance with an aspect of the embodiment of the invention, the piezoelectric film and the ferroelectric film may preferably be composed of the same material. In accordance with the present embodiment, the piezoelectric film and the ferroelectric film can be formed in the same process, such that the manufacturing process can be simplified.

Also, in the display device in accordance with an aspect of the embodiment of the invention, the piezoelectric film and the ferroelectric film may preferably be composed of an organic material. In accordance with the present embodiment, the piezoelectric film and the ferroelectric film can be formed by using a liquid phase method, such as, for example, a liquid droplet ejection method or a spin coat method, such that the manufacturing cost can be reduced. Also, a low temperature process can be used, in contrast to the case where the piezoelectric film and the ferroelectric film are formed with inorganic materials.

Also, in the display device in accordance with an aspect of the embodiment of the invention, the selection switching element and the pressure sensitive switching element may be composed of inorganic semiconductor as a main composition. In accordance with the present embodiment, semiconductor layers composing the selection switching element and semiconductor layers composing the pressure sensitive switching element can be formed in the same process.

Also, the display device in accordance with an aspect of the embodiment of the invention may be equipped with microcapsules containing electrophoretic dispersion liquid and a pair of substrates interposing the microcapsules. In accordance with the present embodiment, the microcapsules containing the electrophoretic dispersion liquid form the pixel region that has a display retention property.

A method for manufacturing a display device in accordance with an embodiment of the invention pertains to a method for manufacturing a display device of active matrix driving type having a plurality of pixel regions arranged in a plane, the method including the steps of forming a selection switching element that controllably switches a supply of a signal to the pixel region, forming a pressure sensitive switching element that controllably switches a supply of a signal to the pixel region in response to an input of an external pressure, and forming a retention capacitance that retains a signal supplied to the pixel region, wherein the step of forming the pressure sensitive switching element includes forming a semiconductor layer having a channel region, and a piezoelectric film laminated on the channel region, and the step of forming the retention capacitance includes forming a pair of capacitance electrodes and forming a ferroelectric film sandwiched between the pair of capacitance electrodes. In accordance with the present embodiment of the invention, an independent display can be made on a normal display, and lower power consumption and larger screen sizes can be achieved, like the embodiment described above. Also, the display state of the pixel region can be read out externally.

Also, in the method for manufacturing a display device in accordance with an aspect of the embodiment of the invention, the piezoelectric film and the ferroelectric film may preferably be composed of the same material. In accordance with the present embodiment, the piezoelectric film and the ferroelectric film can be formed in the same process, such that the manufacturing process can be simplified, like the embodiment described above.

Electronic paper in accordance with an embodiment of the invention is equipped with the display device described above. In accordance with the present embodiment, an independent display can be made on a normal display, and lower power consumption and larger screen sizes can be achieved, like the embodiment described above. Also, the display state of the pixel region can be read out externally.

DESCRIPTION OF EXEMPLARY EMBODIMENTS

Electrophoretic Display Device

Figure 1:
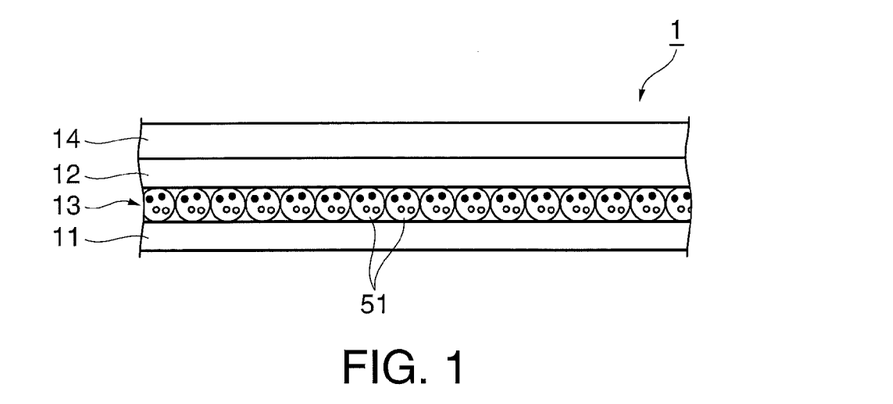
FIG. 1 is a schematic cross-sectional view of an electrophoretic display device in accordance with an embodiment of the invention.
Figure 2:
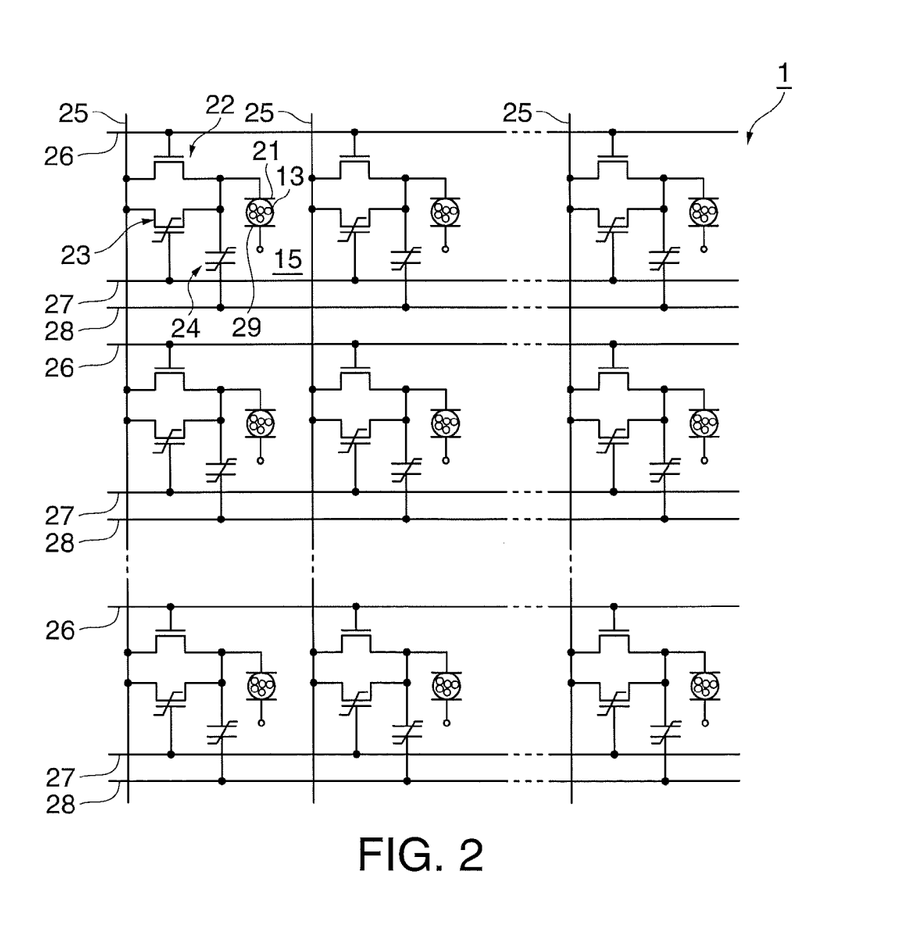
FIG. 2 is an equivalent circuit diagram of the device shown in FIG. 1.
Figure 3:
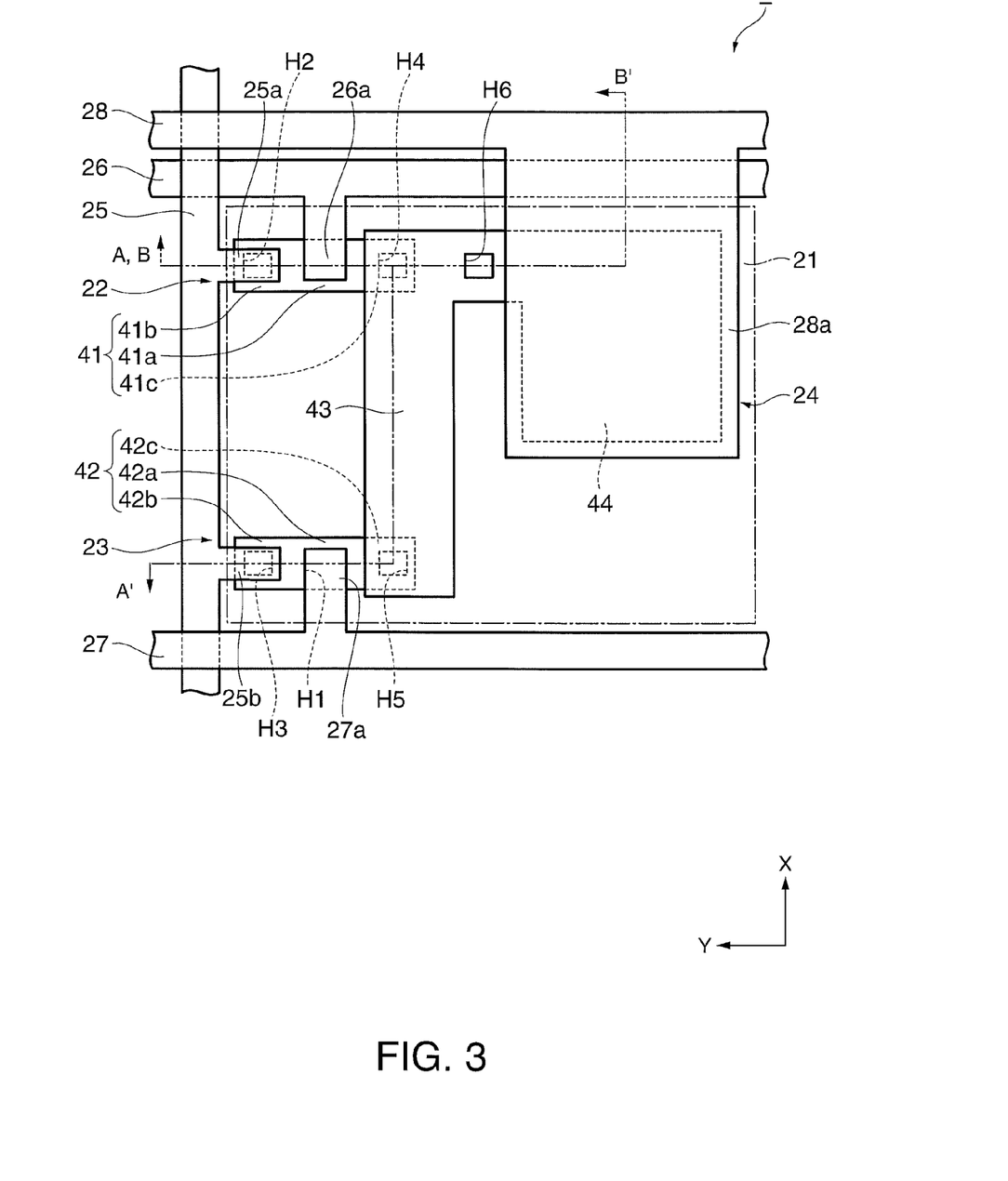
FIG. 3 is a structural plan view showing a pixel region.
Figure 4A:
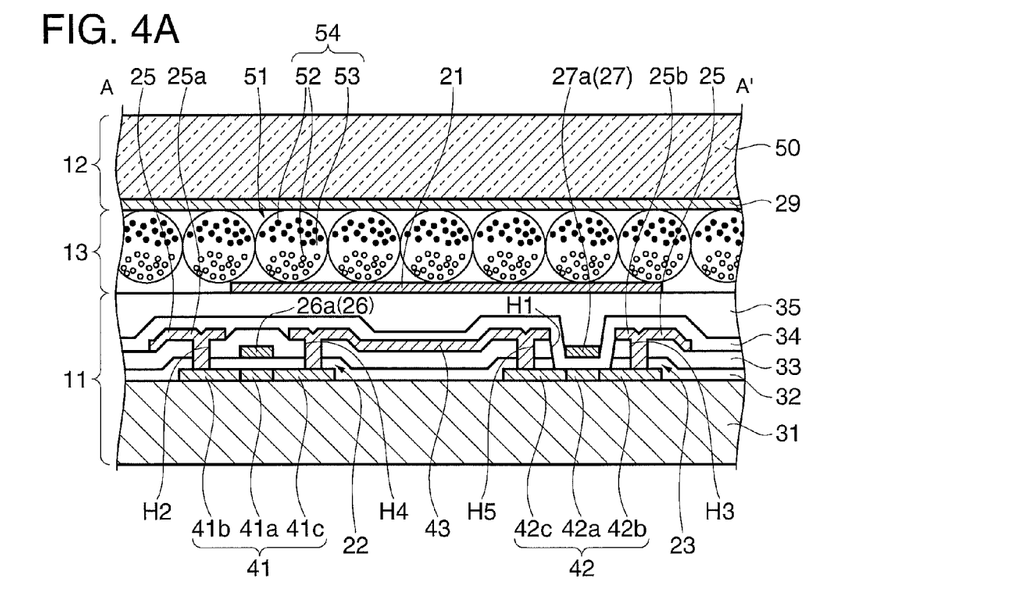
FIGS. 4A and 4B are cross-sectional views taken along a line A-A' and a line B-B' of FIG. 3, respectively.
Figure 4B:
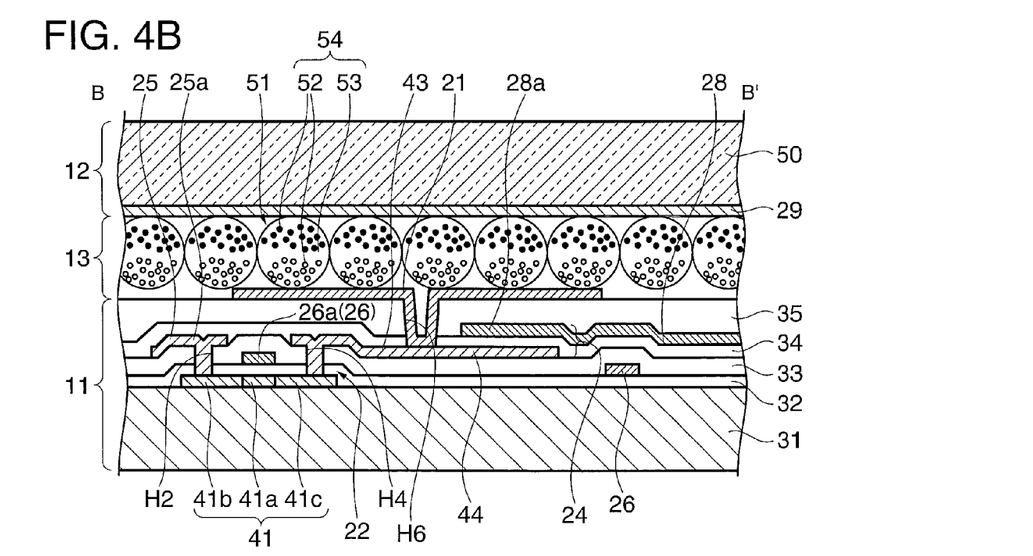

An electrophoretic display device in accordance with an embodiment of the invention is described below with reference to the accompanying drawings. It is noted that, in each of the figures used for the description below, the scale of each of the members is appropriately changes such that each of the members is recognizable. FIG. 1 is a schematic cross-sectional view of the electrophoretic display device. FIG. 2 is an equivalent circuit diagram of the electrophoretic display device shown in FIG. 1. FIG. 3 is a structural plan view showing a pixel region of the electrophoretic display device. FIGS. 4A and 4B are cross-sectional views taken along a line A-A' and a line B-B' of FIG. 3, respectively.

First, the structure of the electrophoretic display device (display device) 1 in accordance with the present embodiment is described. The electrophoretic display device 1 in accordance with the present embodiment is equipped with a first substrate (one of substrates) 11 that is an active matrix substrate, a second substrate (the other substrate) disposed opposite to the first substrate 11, and an electrophoretic layer 13 held between the first substrate 11 and the second substrate 12. In the electrophoretic display device 1, an external surface of the second substrate 12 (the side separated from the electrophoretic layer 13) defines a display surface. Also, the electrophoretic display device 1 is equipped with a protection film 14 that covers the entire external surface of the second substrate 12. Also, the electrophoretic display device 1 is provided with an image display region in an area where the electrophoretic layer 13 is formed.

As shown in FIG. 2, a plurality of pixel regions 15 are arranged in a matrix in the image display region of the electrophoretic display device 1. Each of the plural pixel regions 15 is provided with a pixel electrode 21, a TFT (Thin Film Transistor) element (selection switching element) 22 for controllably switching the pixel electrode 21, and a switching element (pressure sensitive switching element) 23. Also, in the image display region, plural data lines (signal lines) 25, scanning lines 26, polarization processing lines 27 and capacitance lines 28 are arranged in a lattice configuration.

The TFT element 22 has a source connected to the data line 25, a gate connected to the scanning line 26, and a drain connected to the pixel electrode 21. Also, the switching element 23 has a structure similar to that of the TFT element 22, and has a source connected to the data line 25, a gate connected to the polarization processing line 27, and a drain connected to the pixel electrode 21. The retention capacitance 24 is added in a manner to be connected in parallel to a capacitance component that is formed between the pixel electrode 21 and the common electrode 29, and is structured to retain an image signal and a signal provided through direct input. The data line 25 is structured to supply an image signal that is supplied from a driving circuit (not shown) provided outside the image display region to each of the pixel regions 15. The scanning line 26 is structured to supply a scanning signal that is supplied from the driving circuit to the pixel regions 15. The capacitance line 28 connects the retention capacitances 24 provided in the pixel regions 15. Further, the polarization processing line 27 connects gates of the switching elements 23 provided in the pixel regions 15.

Next, the structure of the electrophoretic display device 1 is described in detail with reference to FIGS. 3 and 4. It is noted that FIGS. 3 and 4 show only an example of the structure of the pixel region 15, and the arrangement of each of the members may be appropriately changed according to their respective design. It is noted that, in FIG. 3, illustration of the second substrate 12 is omitted. Also, in FIG. 3, a direction along one side of the pixel region 15 that is generally rectangular in a plan view is defined as an X-axis direction, and a direction along the other side perpendicular to the X axis direction is defined as a Y-axis direction.

The first substrate 11 is equipped with a substrate main body 31, and a gate dielectric film 32, an interlayer dielectric film 33, a piezoelectric ferroelectric film (piezoelectric film, ferroelectric film) 34 and a protection film 35 successively laminated on an inner surface (on the side of the electrophoretic layer 13) of the substrate main body 31. Also, the first substrate 11 is equipped with semiconductor layers 41 and 42 arranged on the inner surface of the substrate main body 31, the scanning line 26 disposed on the inner surface of the gate dielectric film 32, the data line 25 disposed on the inner surface of the interlayer dielectric film 33, a connection electrode 43 and the capacitance electrode (one of the capacitance electrodes) 44, the polarization processing line 27 and the capacitance line 28 disposed on the inner surface of the piezoelectric ferroelectric film 34, and the pixel electrode 21 disposed on the inner surface of the protection film 35.

The substrate main body 31 is composed of a material such as glass, quartz and the like, that is resistive to process damage that may be caused when inorganic semiconductor such as polysilicon is formed. The gate dielectric film 32 is composed of a dielectric material such as $SiO_2$ (silicon dioxide), and is formed in a manner to cover the semiconductor layers 41 and 42 formed on the substrate main body 31. The interlayer dielectric film 33 is composed of a dielectric material such as SiNx (silicon nitride), and is formed in a manner to cover the gate dielectric film 32 and the scanning line 26 formed on the gate dielectric film 32.

The piezoelectric ferroelectric film 34 is composed of a ferroelectric material formed from an organic material having the piezoelectric effect, such as, copolymer of vinylidene fluoride (VDF) and trifluoroethylene (with a dielectric constant being, for example, 6-13, and a piezoelectric constant being, for example, 0.32-0.38 Vm/N). Further, the piezoelectric ferroelectric film 34 is provided in a manner to cover the data line 25, the connection electrode 43 and the capacitance electrode 44 formed on the interlayer dielectric film 33. Also, the piezoelectric ferroelectric film 34 covers a channel region 42a (to be described below) of the semiconductor layer 42 through a contact hole H1 that penetrates the gate dielectric film 32 and the interlayer dielectric film 33. The protection film 35 is composed of, for example, acrylic resin, and is provided in a manner to cover the polarization processing line 27 and the capacitance line 28 formed on the piezoelectric ferroelectric film 34.

The semiconductor layer 41 is formed in a manner to include a region that overlaps the scanning line 26 through the gate dielectric film 32 as viewed in a plan view, as shown in FIGS. 3 and 4, and is composed of inorganic semiconductor such as polysilicon. Also, the semiconductor layer 41 is provided with a channel region 41a formed in an area that overlaps the scanning line 26 through the gate dielectric film 32 as viewed in a plan view. Furthermore, the semiconductor layer 41 is provided with a source region 41b and a drain region 41c formed by implanting impurity ions in the polysilicon. The TFT element 22 is formed with the semiconductor layer 41 as a main body. It is noted that the TFT element 22 may use an LDD structure in which a high concentration region of a relatively high impurity concentration and a low concentration region of a relatively low impurity concentration (LDD: lightly doped drain) are formed in the source region 41b and the drain region 41c of the semiconductor layer 41, respectively.

The semiconductor layer 42 is formed in a manner to include an area that overlaps the polarization processing line 27 through the gate dielectric film 32 as viewed in a plan view, like the semiconductor layer 41, and is composed of inorganic semiconductor such as polysilicon. Also, the semiconductor layer 42 is provided with a channel region 42a in an area that overlaps the polarization processing line 27 through the piezoelectric ferroelectric film 34 as viewed in a plan view. Furthermore, the semiconductor layer 42 is provided with a source region (one of the doped regions) 42b and a drain region (the other doped region) 42c formed by implanting impurity ions in the polysilicon. The switching element 23 is formed with the semiconductor layer 42 and the piezoelectric ferroelectric layer 34 as a main body. It is noted that the switching element 23 may use an LDD structure, like the TFT element 22.

The scanning lines 26 are arranged along a direction of one side of the pixel region 15 (Y-axis direction) that is rectangular in a plan view, and may be composed of a metal material, such as, Al (aluminum). Also, the scanning line 26 is provided with a branch section 26a that overlaps the channel region 41a through the gate dielectric film 32 in a plan view, thereby functioning as a gate electrode.

The data lines 25 are arranged along a direction of the other side of the pixel region 15 (X-axis direction) in a plan view, and may be composed of a metal material, such as, Al/Cu (copper). Also, the data line 25 is provided, as viewed in a plan view, with a branch section 25a that overlaps the source region 41b of the semiconductor layer 41 through the gate dielectric film 32 and the interlayer dielectric film 33, and a branch section 25b that overlaps the source region 42b of the semiconductor layer 42. The branch section 25a is connected to the source region 41b of the semiconductor layer 41 through a contact hole H2 that penetrates the gate dielectric film 32 and the interlayer dielectric film 33. Furthermore, the branch section 25b is connected to the source region 42b of the semiconductor layer 42 through a contact hole H3 that penetrates the gate dielectric film 32 and the interlayer dielectric film 33.

The connection electrode 43 is composed of a metal material, such as, Al/Cu, which may be the same material as that of the data lines 25. Further, the connection electrode 43 is connected to the drain region 41c of the semiconductor layer 41 through a contact hole H4 that penetrates the gate dielectric film 32 and the interlayer dielectric film 33 and connected to the drain region 42c of the semiconductor layer 42 through a contact hole H5 that penetrates the gate dielectric film 32 and the interlayer dielectric film 33.

The capacitance electrode 44 is composed of a metal material, such as, Al/Cu, which may be the same material as that of the data lines 25 and the connection electrode 43. Also, the capacitance electrode 44 is formed in one piece with the connection electrode 43, and overlaps a branch section 28a (to be described below) of the capacitance line 28 through the piezoelectric ferroelectric film 34.

The polarization processing line 27 is arranged along a direction of one side of the pixel region 15 (Y-axis direction) as viewed in a plan view, and is composed of a metal material, such as, Ag (silver). Also, the polarization processing line 27 is provided with a branch section 27a that overlaps the channel region 42a of the semiconductor layer 42 through the piezoelectric ferroelectric film 34 as viewed in a plan view, thereby functioning as a gate electrode. Upon application of a voltage to the polarization processing line 27, polarization processing of the piezoelectric ferroelectric film 34 composing the switching element 23 in each of the pixel regions 15 is performed.

The capacitance line 28 is arranged along the Y-axis direction of the pixel region 15 as viewed in a plan view, and is composed of the same material as that of the polarization processing line 27. Also, the capacitance line 28 is provided with a branch section (the other capacitance electrode) 28a that overlaps the capacitance electrode 44 through the piezoelectric ferroelectric film 34 as viewed in a plan view. The capacitance electrode 44, the piezoelectric ferroelectric film 34 and the branch section 28a form a retention capacitance 24.

It is noted that the polarization processing line 27 and the capacitance line 28 are in direct contact with the piezoelectric ferroelectric film 34, and therefore the films may preferably be formed by a method that does not inflict process damage to the piezoelectric ferroelectric film 34. More specifically, the polarization processing line 27 and the capacitance line 28 may preferably be formed by a liquid phase film deposition method, such as, a plating method, an ink jet method, or a spin coat method, and may preferably be formed from a metal material, such as, Ag, Ni, and the like, or an electronic conductive polymer, such as, polyaniline.

The pixel electrode 21 may be composed of a metal material, such as, Cu, and have a generally rectangular shape as viewed in a plan view. Examples of the pixel electrode 21 usable include Al, Au (gold), Ag, Pt (platinum), Ni (nickel), Sn (tin) or other metals or an alloy of the foregoing metals, conductive oxides, such as, ITO (indium-tin oxide), electron conductive polymers, such as, polyaniline, or ionic conductive polymers in which an ionic material, such as, NaCl, $LiClO_4$, KCl or the like is dispersed in a matrix resin, such as, polyvinyl alcohol resin, polycarbonate resin or the like.

Also, the pixel electrode 21 is connected to the connection electrode 43 through a contact hole H6 that penetrates the piezoelectric ferroelectric film 34 and the protection film 35. By this, the pixel electrode 21 is conductively connected to the drain region 41c of the semiconductor layer 41 and the drain region 42c of the semiconductor layer 42.

On the other hand, as shown in FIGS. 4A and 4B, the second substrate 12 is equipped with a substrate main body 50, and a common electrode 29 laminated on a surface of the substrate main body 50 on the side of the electrophoretic layer 13. The substrate main body 50 is composed of a flexible material having light transmission property, such as, a transparent glass or resin film. Examples of the material of the substrate main body 50 usable include polyester resins, such as, polyethylene terephthalate (PET) and polyethylene naphthalate (PEN); polyether sulfone (PES); polycarbonate (PC); and polyethylene (PE).

The common electrode 29 is composed of a light transmissive conducive material, such as, ITO. Examples of the material of the common electrode 29 usable include other conductive oxides and electronic conductive polymers, such as, polyanilines; and ionic conductive polymers each containing an ionic material, such as, NaCl, $LiClO_4$, KCl or the like dispersed in a matrix resin, such as, a polyvinyl alcohol resin, a polycarbonate resin or the like.

The electrophoretic layer 13 includes numerous microcapsules 51 densely arranged. The microcapsules 51 each contain an electrophoretic dispersion 54 having electrophoretic particles 52 and a liquid-phase dispersion medium 53 for dispersing the particles therein. The microcapsules 51 have substantially the same diameter. In this embodiment, the microcapsules 51 each have a diameter of about 50 μm. When an electric field is applied to the electrophoretic dispersion 54, the distribution state of the electrophoretic particles 52 changes, thereby changing optical properties of the electrophoretic dispersion 54.

The electrophoretic particles 52 are organic or inorganic particles (polymer or colloid) having a property in which the particles move in the liquid-phase dispersion medium 53 by electrophoresis due to a potential difference. Examples of the electrophoretic particles 52 include black pigments, such as, aniline black, carbon black, and titanium black; white pigments, such as, titanium dioxide, zinc white, and antimony trioxide; azo pigments, such as, monoazo, disazo, and polyazo; yellow pigments, such as, isoindolinone, chrome yellow, yellow iron oxide, cadmium yellow, titan yellow, and antimony; azo pigments, such as, monoazo, disazo, and polyazo; red pigments, such as, quinacridone red and chrome vermilion; blue pigments, such as, phthalocyanine blue, indanthrene blue, an anthraquinone dye, Prussian blue, ultramarine blue, and cobalt blue; green pigments, such as, phthalocyanine green. One or two or more of the aforementioned substances may be used. According to the necessity, the pigment may further contain a charge control agent, such as, particles composed of an electrolyte, a surfactant, metallic soap, a resin, rubber, an oil, a varnish, or a compound; a dispersant, such as, a titanium coupling agent, an aluminum coupling agent, or a silane coupling agent; a lubricant; and a stabilizer. Two types of the electrophoretic particles 52, carbon black that is positively charged black pigment and titanium dioxide that is negatively charged white pigment, are used.

Examples of the liquid-phase dispersion medium 53 include a combination of a surfactant and the like with one or a mixture selected from water; alcohol solvents, such as, methanol, ethanol, isopropanol, butanol, octanol, and methyl cellosolve; esters, such as, ethyl acetate and butyl acetate; ketones, such as, acetone, methyl ethyl ketone, and methyl isobutyl ketone; aliphatic hydrocarbons, such as, pentane, hexane, and octane; alicyclic hydrocarbons, such as, cyclohexane and methylcyclohexane; aromatic hydrocarbons such as long-chain alkyl group-containing benzenes, such as, for example, benzene, toluene, xylenes, hexylbenzene, heptylbenzene, octylbenzene, nonylbenzene, decylbenzene, undecylbenzene, dodecylbenzene, tridecylbenzene, and tetradecylbenzene; halogenated hydrocarbons, such as, methylene chloride, chloroform, carbon tetrachloride, and 1,2-dichloroethane; carboxylates; and other various oils.

Examples of the material forming the wall film of each microcapsule 51 include composites of gum arabic and gelatin; and compounds, such as, urethane resins, melanin resins, and urea resins.

The microcapsules 51 are fixed on the first and second substrates 11 and 12 with a binder (not shown). It is noted that the binder used here have satisfactory affinity for the film of each microcapsule 51, excellent adhesion to the common electrode 29, and insulating properties. Examples of the binder include thermoplastic resins, such as, polyethylene, chlorinated polyethylene, ethylene-vinyl acetate copolymers, ethylene-ethyl acrylate copolymers, polypropylene, ABS resins, methyl methacrylates resins, vinyl chloride resins, vinyl chloride-vinyl acetate copolymers, vinyl chloride-vinylidene chloride copolymers, vinyl chloride acrylate ester copolymers, vinyl chloride-methacrylic acid copolymers, vinyl chloride-acrylonitrile copolymers, ethylene-vinyl alcoholvinyl chloride copolymers, propylene-vinyl chloride copolymers, vinylidene chloride resins, vinyl acetate resins, polyvinyl alcohol, polyvinyl formal, and cellulose resins; polymers, such as, polyamide resins, polyacetal, polycarbonate, polyethylene terephthalate, polybutylene terephthalate, polyphenylene oxide, polysulfone, polyamide-imide, polyaminobismaleimide, polyether sulfone, polyphenylene sulfone, polyalylate, graft polyphenylene ether, polyether ethyl ketone, and polyether-imides; fluorinated resins, such as, polytetrafluoroethylene, poly(fluorinated ethylene propylene), tetrafluoroethylene-perfluoroalkoxyethylene copolymers, ethylene-tetrafluoroethylene copolymers, polyvinylidene fluoride, polychlorotrifluoroethylene, and fluorocarbon rubber; silicone resins, such as, silicone resins and silicone rubber; and other compounds, such as, methacrylic acid-styrene copolymers, polybutylene, and methyl methacrylate-butadiene-styrene copolymers.

Method for Manufacturing Electrophoretic Display Device

Next, a method for manufacturing an electrophoretic display device 1 having the structure described above is described with reference to FIGS. 5A-5C and FIGS. 6A-6C. FIGS. 5A-5C and FIGS. 6A-6C are cross-sectional views showing a process for manufacturing a first substrate 11.

Figure 5A:
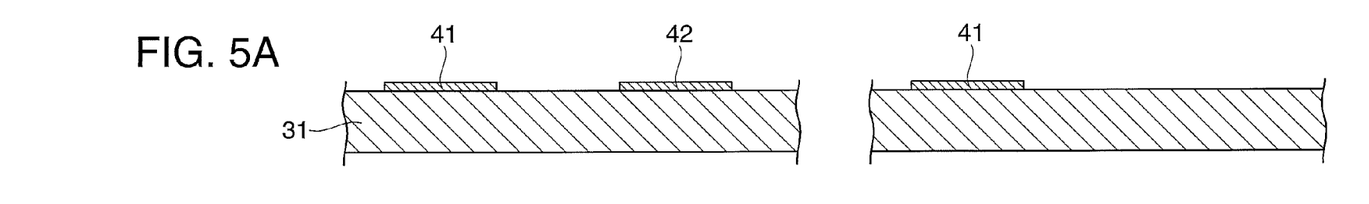
FIGS. 5A-5C are cross-sectional views showing a process for manufacturing a first substrate.

First, semiconductor layers 41 and 42 are formed on a substrate main body 31. Here, an amorphous semiconductor layer composed of amorphous silicon is deposited by using a PECVD (plasma enhancement chemical vapor deposition: plasma CVD) method. Then, for example, by irradiating an excimer laser beam of XeCl (xenon chloride), the amorphous semiconductor layer is crystallized, whereby a polycrystal semiconductor layer is formed. Next, the polycrystal semiconductor is patterned by a photolithography technique, thereby forming the semiconductor layers 41 and 42 (FIG. 5A).

Next, a gate dielectric film 32 that covers the semiconductor layers 41 and 42 and the substrate main body 31 is formed. The gate dielectric film 32 is formed by using a CVD method or the like.

Figure 5B:
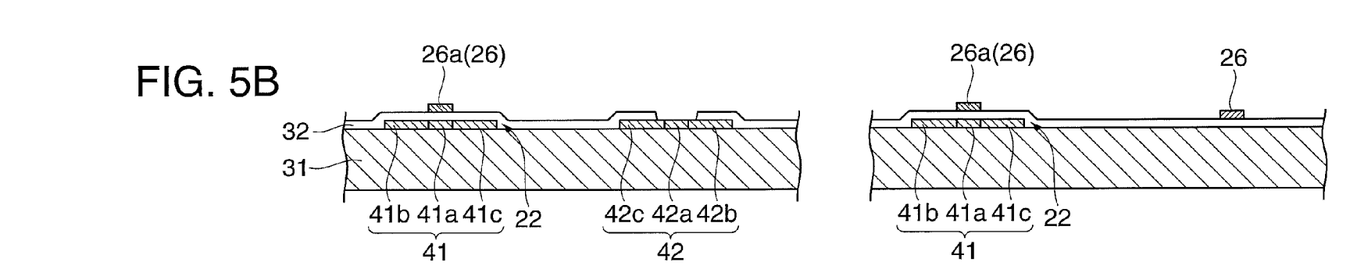

Then, a scanning line 26 is formed on the gate dielectric film 32. Here, a metal film for forming the scanning line 26 is formed on the gate dielectric film 32 by using a sputter method or the like, and the metal film is patterned by using a photolithography technique or the like. As a result, the scanning line 26 is formed.

Then, impurity ions in high concentration are implanted in the semiconductor layers 41 and 42. Here, a resist layer (not shown) that covers an area of the semiconductor layer 42 which becomes a channel region 42a is formed. Then, impurity ions (phosphorous ions) in high concentration are implanted at opening regions in the resist layer. In this instance, the resist layer and the scanning line 26 function as a mask. Then, the resist layer is removed. As a result, source regions 41b and 42b and drain regions 41c and 42c are formed (FIG. 5B).

Figure 5C:
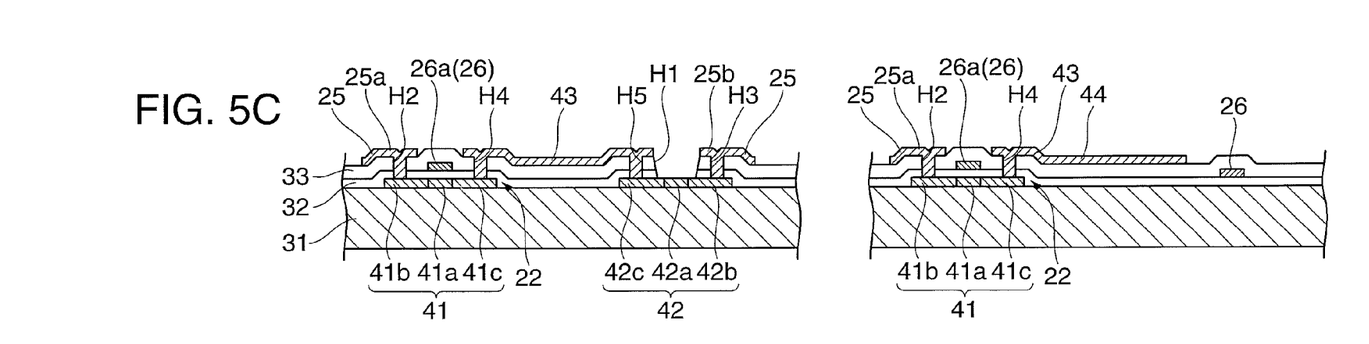

Then, an interlayer dielectric film 33 that covers the scanning line 26 is formed over the gate dielectric film 32. The interlayer dielectric film 33 is formed by using a CVD method or the like. Then, contact holes H1-H5 that penetrate the gate dielectric film 32 and the interlayer dielectric film 33 are formed. In this instance, the channel region 42a of the semiconductor layer 42 is exposed through the contact hole H1.

Then, a data line 25, a connection electrode 43 and a capacitance electrode 44 are formed on the interlayer dielectric film 33. Here, a metal film that composes the data line 25, the connection electrode 43 and the capacitance electrode 44 is formed on the interlayer dielectric film 33 by a sputter method or the like, and the metal film is patterned by using a photolithography technique or the like. As a result, the data line 25, the connection electrode 43 and the capacitance electrode 44 are formed (FIG. 5C). In this instance, a branch section 25b of the data line 25 is connected to the source region 41b through the contact hole H2, a branch section 25b is connected to the source region 42b through the contact hole H3, and the connection electrode 43 is connected to the drain region 41c through the contact hole H4 and to the drain region 42c through the contact hole H5.

Figure 6A:
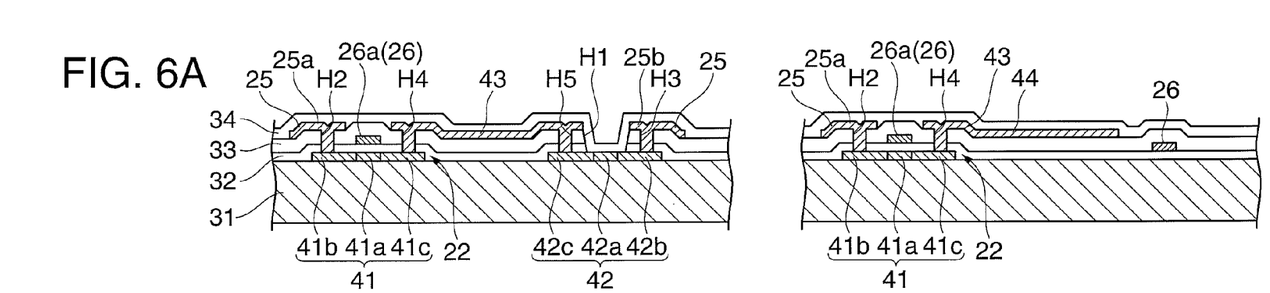
FIGS. 6A-6C are also cross-sectional views showing the process for manufacturing the first substrate.
Figure 6B:
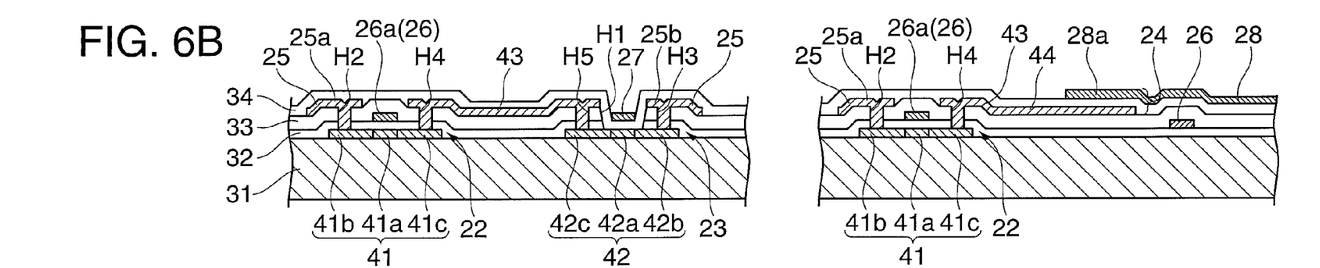

Next, a piezoelectric ferroelectric film 34 that covers the data line 25, the connection electrode 43, the capacitance electrode 44 and the interlayer dielectric film 33 is formed. Here, a liquid containing organic materials that compose the piezoelectric ferroelectric film 34 dispersed or dissolved in a solvent is coated by a spin coat method, an ink jet method, a LSMCD (liquid source misted chemical deposition) method, and then the solvent is removed. Also, depending on the necessity, a low temperature heat treatment (for example, at about 140° C.) may be conducted. The LSMCD method can create a mist of uniform sized particles, thereby forming a uniform film at room temperature. As a result, the piezoelectric ferroelectric film 34 is formed (FIG. 6A).

Figure 6C:
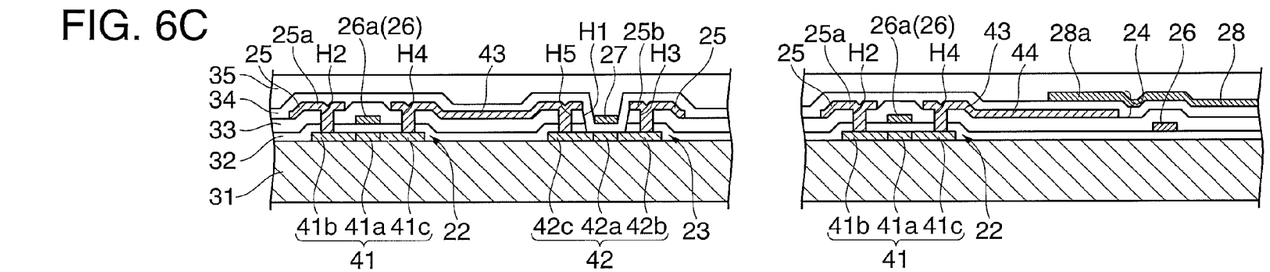

Then, a polarization processing line 27 and a capacitance line 28 are formed on the piezoelectric ferroelectric film 34. Here, a metal film that composes the polarization processing line 27 and the capacitance line 28 is formed by using a liquid phase method such as an electroless plating method, and the formed film is patterned by using a photolithography technique and a wet-etching method. As a result, the polarization processing line 27 and the capacitance line 28 are formed (FIG. 6C).

Next, a protection film 35 that covers the polarization processing line 27, the capacitance line 28 and the piezoelectric ferroelectric film 34 is formed. Here, a liquid containing acryl that composes the protection film 35 dispersed or dissolved in a solvent is coated by using a spin coat method or the like, and then the solvent is removed. By this, the protection film 35 is formed (FIG. 6C). Then, a contact hole H6 that penetrates the piezoelectric ferroelectric film 34 and the protection film 35 is formed.

Then, a pixel electrode 21 is formed on the protection film 35. Here, a film of conductive material that composes the pixel electrode 21 is formed by a liquid phase method such as an electroless plating method, and the formed film is patterned by using a photolithography technique and a wet-etching method. By this, the pixel electrode 21 is formed. It is noted that the pixel electrode 21 may be formed by any other appropriate methods. In this instance, the pixel electrode 21 is connected to the connection electrode 43 through the contact hole H6 (see FIG. 4). By the steps described above, the first substrate 11 is fabricated.

Then, microcapsules 51 are fixed with a binder between the first substrate 11 and a second substrate 12, whereby an electrophoretic layer 13 is formed.

Operation of Electrophoretic Display Device

Next, operations of the electrophoretic display device 1 having the structure described above are briefly described. First, a normal image display method is described. When a scanning signal is inputted from a driving circuit provided outside of the image display region through the scanning line 26, the TFT element 22 turns on for a predetermined period. When an image signal is inputted in the TFT element 22 that is turned on, the image signal is written to the pixel electrode 21. The written image signal is retained between the pixel electrode 21 and the common electrode 29. For this reason, for example, when inputting an image signal that turns the pixel electrode 21 to be positive and the common electrode 29 to be negative, the positively charged black electrophoretic particles 52 that compose the electrophoretic layer 13 placed between the pixel electrode 21 and the common electrode 29 migrate toward the common electrode 29. By this, a display in black takes place in the image region 15. In the manner described above, a normal image display is performed.

In this instance, the display state of the pixel region 15 is retained because the electrophoretic layer 13 has display retaining properties. Accordingly, once a desired display is performed, electric power does not need to be supplied until a next display is performed, and the display state is retained until another signal is supplied again. Also, the image signal inputted to the pixel electrode 21 is retained by the retention capacitance 24. It is noted that, by inputting the inverted voltage across the pixel electrode 21 and the common electrode 29, in other words, by inputting a signal that turns the pixel electrode 21 to be negative and the common electrode 29 to be positive, the image display state can be returned to an initial state.

Next, another image display method to perform a display by direct input of underlines, memos and the like, which can be performed in addition to the normal image display, is described. When a pressure is applied to the pixel region 15 from the side of the second substrate 12 by, for example, a pen, an electric charge by voltage conversion is generated in the piezoelectric ferroelectric film 34. By this, the switching element 23 turns on for a predetermined period. Then, by inputting a signal through the data line 25 to the switching element 23 that is turned on, the signal is written to the pixel electrode 21 in a similar manner as described above. By this, a display in black takes place in the pixel region 15 to which the pressure is applied. In this manner, the other image display by direct input is performed.

In this instance, a special-purpose pen having a power supply and special functions is not needed, as it only requires applying an appropriate pressure to the switching element 23. Also, in a manner similar to the above, once a desired display is performed, electric power does not need to be supplied until a next display is performed, and the display state is retained until another signal is supplied again. Also, in a manner similar to the above, the signal inputted to the pixel electrode 21 is also retained by the retention capacitance 24. It is noted that, by inputting the inverted voltage across the pixel electrode 21 and the common electrode 29, in other words, the image display state can be returned to an initial state.

Next, a method for reading an image on the pixel region 15 is described. By inputting a readout signal that is a pulse signal through the capacitance line 28 to the retention capacitance 24, the inputted signal is outputted externally from the data line 25 through the retention capacitance 24 and the TFT element 22. In this instance, by inputting a scanning signal to the TFT element 22 through the scanning line 26 in synchronism with the input of the readout signal, the TFT element 22 provided in the pixel region 15 to which the readout signal is inputted is turned to an ON state. According to the direction of polarization retained by the retention capacitance 24, the intensity of the readout signal outputted changes. In a manner described above, the display state of the pixel region 15 is read out externally.

Electronic Paper

Figure 7:
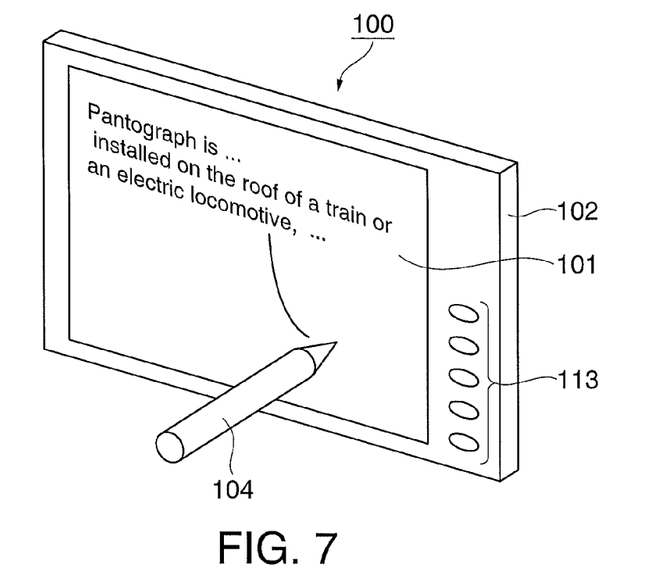
FIG. 7 is a perspective view of an electronic paper device having an electrophoretic display device.

The electrophoretic display device 1 having the structure described above may be used, for example, as a display section 101 of an electronic paper 100 shown in FIG. 7. The electronic paper 100 is equipped with a display section 101, a main body 102 and an operation section 103.

The electronic paper 100 is a so-called "electronic drawing board" in which data that is stored in a storage section (not shown) provided in the main body 102 may be displayed on the display section 101, and a desired content may be added by a pen 104 while the data is displayed. The operation section 103 may be provided with an all-clear button that entirely erases the image displayed on the display section 101 and a partial erasure button.

The electronic paper 100 described above may be suitable for use, for example, when a salesperson explains products to a small number of people in a business negotiation. For example, while a catalog of products is displayed, the salesperson can explain the products while emphasizing the points of appeal of the products.

Figure 8:
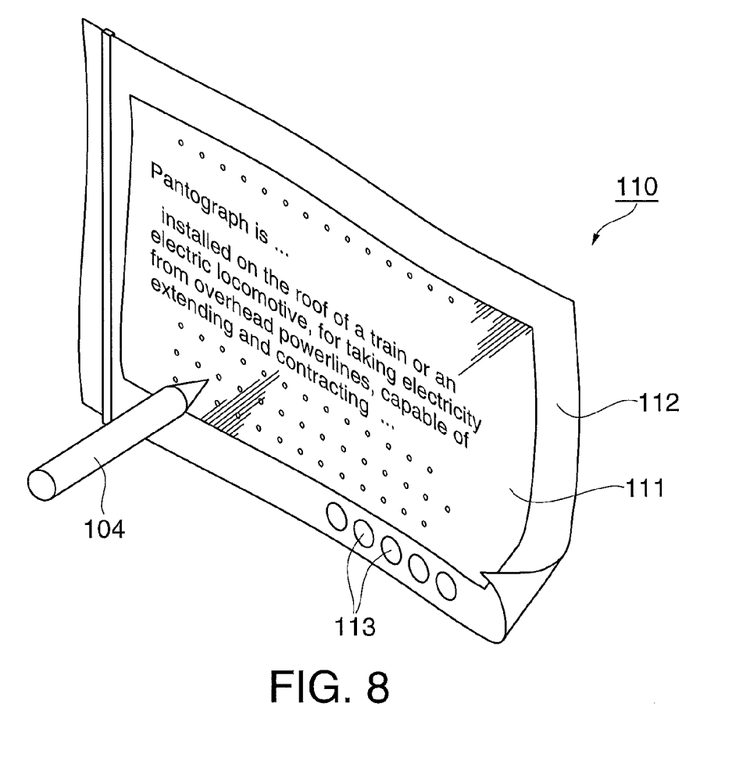
FIG. 8 is a perspective view of another electronic paper device having an electrophoretic display device.

Also, the electrophoretic display device 1 may be used, for example, as a display section 111 of an electronic paper 110 shown in FIG. 8. The electronic paper 110 may be equipped with a substrate main body 31 that is composed of a flexible material, a main body section 112 having a similar flexibility as that of the substrate main body 31, and an operation section 113 formed from a plurality of membrane switches. It is noted that, for forming the substrate main body 31 with a flexible material such as a polyorefine resin film, for example, the technologies described in Japanese Laid-open Patent Applications JP-A-10-125929 and JP-A-10-125931 filed by the applicant may preferably be used.

The operation section 113 includes operation buttons, such as, the above-described all-clear button, partial erasure button and the like. By pressing these button sections by a pen 104 or the finger, desired functions can be realized. Further, the plurality of buttons may each have the same structure as that of the switching element 23. In this case, switching elements 23 in the required number are formed in a peripheral section of the display section 111 by a process similar to the process described above.

The mode of the electronic paper 110 is similar to that of paper, and may be formed into a thickness of 1 mm or less, for example. For this reason, the electronic paper 110 is lightweight and easy to hold, and therefore it excels in usability. For example, the electronic paper 110 can be carried in a thin paper folder and retrieved when necessary, and displayed texts and/or objects may be explained on the spot while marking their key points on the electronic paper 110.

According to the electrophoretic display device 1, the method for manufacturing the electrophoretic display device 1, and the electronic paper 100 in accordance with the embodiment of the invention described above, an image display can be performed through direct input by the switching element 23, in addition to a normal display obtained through the TFT element 22. Also, the electrophoretic layer 13 composing the pixel region 15 has a retention property to retain a display, lower power consumption and larger sized screens can be achieved. Furthermore, an electrical charge is accumulated in the retention capacitance 24 according to an image signal or a signal inputted through direct input, such that the display state of the pixel region 15 can be outputted externally.

Also, the switching element 23 is a pressure sensor, such that it enables direct input using an ordinary pen that does not require power supply. In this embodiment, the switching element 23 has a laminate structure of the semiconductor layer 42 and the piezoelectric ferroelectric film 34, and is not provided with a movable section that is movable upon application of an external pressure, such that the reliability of the switching element 23 is improved.

Furthermore, the TFT element 22 and the switching element 23 are connected to a common data line 25, such that their structure can be simplified.

Moreover, by using the piezoelectric ferroelectric film 34 as a piezoelectric film composing the switching element 23 and a ferroelectric film composing the retention capacitance 24, they can be formed in the same process. Also, by forming the piezoelectric ferroelectric film 34 with organic materials, an inexpensive liquid phase method can be used, and therefore the manufacturing cost can be reduced. Also, a low temperature process can be used, in contrast to the case where they are formed from inorganic materials.

It is noted that the invention is not limited to the embodiments described above, and many changes can be made within the range that does not depart from the subject matter of the invention.

For example, the switching element in accordance with the present embodiment has a structure in which the semiconductor layer and the piezoelectric ferroelectric film are laminated in this order from the side of the substrate main body, but may have a structure in which the piezoelectric ferroelectric film and the semiconductor layer are laminated in this order from the side of the substrate main body.

Also, in each pixel region, the TFT element and the switching element are connected to the common data line. But the TFT element and the switching element may be connected to independent data lines (signal lines), respectively. By this, driving for performing a normal display and driving by direct input can be provided with mutually different display characteristics. For example, by lowering the voltage to be applied to the data line connected to the switching element than that to be applied to the other data line, thereby reducing the amount of charge that is accumulated when the switching element is turned to an ON state, grayscale representation can be more readily made. Also, when a direct input is performed, a voltage may not be applied to the data line connected to the TFT element, such that generation of a leakage current that may be caused by the TFT element can be suppressed. Similarly, when a normal display is performed, a voltage may not be applied to the data line connected to the switching element, such that generation of a leakage current that may be caused by the switching element can be suppressed.

Also, the piezoelectric ferroelectric film is provided in a manner to cover the interlayer dielectric film in accordance with the present embodiment, but may be provided in a manner to cover at least the channel region of the semiconductor layer composing the switching element and the capacitance electrode composing the retention capacitance, such that the piezoelectric ferroelectric film may be formed partially only in desired regions by using a droplet ejection method. By forming the piezoelectric ferroelectric film only in regions corresponding to the switching element and the retention capacitance, formation of parasitic capacitance components in other regions can be prevented.

Also, the piezoelectric film composing the switching element and the ferroelectric film composing the retention capacitance are made of the same material in accordance with the present embodiment, but may be made of mutually different materials. Also, the piezoelectric film and the ferroelectric film can be formed on different layers, respectively.

Also, in each of the pixel regions, the polarization processing line that connects switching elements and performs polarization processing of the piezoelectric ferroelectric film is provided, but the polarization processing line may not have to be provided.

Furthermore, TFT elements are used as the selection switching elements in accordance with the present embodiment, but other elements such as TFDs (Thin Film Diodes) may be used, as long as the elements perform switching control on the pixel electrodes.

Also, the electrophoretic layer uses two kinds of electrophoretic particles, i.e., black and white electrophoretic particles in accordance with the present embodiment. However, the electrophoretic layer may have a structure that uses black electrophoretic particles and white liquid phase dispersion medium, or have a structure in which electrophoretic particles and liquid phase dispersion medium are contained between the first and second substrates, without using microcapsules.

Further, as the display device in accordance with the present embodiment, an electrophoretic display device having an electrophoretic layer is used. However, other display devices may be used as long as the pixel region has a display retention property, and examples of such display devices include a display device formed from liquid crystal elements using cholesteric liquid crystal, a display device formed from electrochromic elements using oxidation reduction reaction, and a display device formed from elements that perform a display by reversing particles having two different colors.

What is claimed is:

1. A display device of active matrix driving type comprising:
   a plurality of pixel regions arranged in a plane, each of the pixel regions including a selection switching element that controllably switches a supply of a signal to the each of the pixel regions, a pressure sensitive switching element that controllably switches a supply of a signal to the each of the pixel regions in response to an input of an external pressure, and a retention capacitance that retains a signal supplied to the each of the pixel regions, wherein the pressure sensitive switching element includes a semiconductor layer having a channel region, and a piezoelectric film laminated on the channel region, and the retention capacitance includes a pair of capacitance electrodes and a ferroelectric film sandwiched between the pair of capacitance electrodes.

2. A display device according to claim 1, wherein the semiconductor layer has a source region conductively connected to a signal line.

3. A display device according to claim 2, wherein the selection switching element is connected to the signal line.

4. A display device according to claim 2, wherein the selection switching element is connected to another signal line.

5. A display device according to claim 1, wherein the piezoelectric film and the ferroelectric film are composed of the same material.

6. A display device according to claim 1, wherein the piezoelectric film and the ferroelectric film are composed of an organic material.

7. A display device according to claim 1, wherein the selection switching element and the pressure sensitive switching element are composed of an inorganic semiconductor as a main composition.

8. A display device according to claim 1, further comprising microcapsules containing electrophoretic dispersion liquid and a pair of substrates interposing the micro capsules.

9. An electronic paper comprising the display device recited in claim 1.

10. A method for manufacturing a display device of active matrix driving type having a plurality of pixel regions arranged in a plane, the method comprising the steps of:
    forming a selection switching element that controllably switches a supply of a signal to each of the pixel regions;
    forming a pressure sensitive switching element that switches a supply of a signal to the each of the pixel regions in response to an input of an external pressure; and
    forming a retention capacitance that retains a signal supplied to the each of the pixel regions,
    wherein the step of forming the pressure sensitive switching element includes forming a semiconductor layer having a channel region, and a piezoelectric film laminated on the channel region, and
    the step of forming the retention capacitance includes forming a pair of capacitance electrodes and forming a ferroelectric film sandwiched between the pair of capacitance electrodes.

11. A method for manufacturing a display device according to claim 10, wherein the piezoelectric film and the ferroelectric film are composed of the same material.

* * * * *